US010201723B2

(12) United States Patent
Deurloo (10) Patent No.: US 10,201,723 B2
(45) Date of Patent: Feb. 12, 2019

(54) DRY PIPE/DELUGE VALVE FOR AUTOMATIC SPRINKLER SYSTEMS

(71) Applicant: The Reliable Automatic Sprinkler Co., Inc., Liberty, SC (US)

(72) Inventor: David Deurloo, Liberty, SC (US)

(73) Assignee: The Reliable Automatic Sprinkler Co., Inc., Liberty, SC (US)

(*) Notice: Subject to any disclaimer, the term of this patent is extended or adjusted under 35 U.S.C. 154(b) by 0 days.

(21) Appl. No.: 14/799,537

(22) Filed: Jul. 14, 2015

(65) Prior Publication Data

US 2016/0008645 A1 Jan. 14, 2016

Related U.S. Application Data

(60) Provisional application No. 62/024,164, filed on Jul. 14, 2014.

(51) Int. Cl.
*A62C 35/68* (2006.01)
*A62C 35/62* (2006.01)
*F16K 15/18* (2006.01)

(52) U.S. Cl.
CPC ............. *A62C 35/68* (2013.01); *A62C 35/62* (2013.01); *F16K 15/181* (2013.01); *F16K 15/186* (2013.01)

(58) Field of Classification Search
CPC ......... A62C 35/68; A62C 35/62; A62C 35/64; A62C 35/645; F16K 1/20; F16K 31/44; F16K 15/181; F16K 15/186
USPC .............. 251/82; 169/19, 21, 17, 16, 22, 20; 137/467
See application file for complete search history.

(56) References Cited

U.S. PATENT DOCUMENTS

| | | | |
|---|---|---|---|
| 2,400,372 A * | 5/1946 | Rider | F16K 1/2007 169/19 |
| 3,307,633 A | 3/1967 | Newall | |
| 5,295,503 A | 3/1994 | Meyer et al. | |
| 5,439,028 A | 8/1995 | Meyer et al. | |
| 5,711,341 A | 1/1998 | Funderburk et al. | |
| 5,794,655 A | 8/1998 | Funderburk et al. | |
| 6,000,473 A | 12/1999 | Reilly | |
| 6,029,749 A | 2/2000 | Reilly et al. | |
| 6,068,057 A | 5/2000 | Beukema | |
| 6,158,520 A | 12/2000 | Reilly et al. | |
| 6,578,602 B1 | 6/2003 | Kirschner | |
| 6,810,963 B2 | 11/2004 | Ringer | |
| 7,322,423 B2 | 1/2008 | Ringer | |
| 7,543,653 B2 | 6/2009 | Reilly et al. | |
| 7,673,695 B2 | 3/2010 | Deurloo | |

(Continued)

*Primary Examiner* — Craig J Price
*Assistant Examiner* — Andrew J Rost
(74) *Attorney, Agent, or Firm* — Venable LLP (57) ABSTRACT

A dry pipe valve includes a main chamber having an input port and an output port, a clapper assembly installed in the main chamber, a pushrod, a pushrod chamber, and a dry valve actuator. The clapper assembly includes a clapper that seals the input port of the main chamber, and a hinged lever that holds the clapper in a closed position or allows the clapper to open. Based on a pressure of a control fluid in the pushrod chamber, the pushrod moves to urge the hinged lever against the clapper to hold the clapper in the closed position, or to release the hinged lever and thereby allow the clapper to open. The dry valve actuator is attached to a housing of the pushrod chamber and controls the pressure of the control fluid in the pushrod chamber.

15 Claims, 8 Drawing Sheets

(56) References Cited

U.S. PATENT DOCUMENTS

| | | |
|---|---|---|
| 7,814,983 B2 | 10/2010 | Ringer |
| 8,051,915 B2 | 11/2011 | Blease et al. |
| 8,281,810 B2 | 10/2012 | Feenstra et al. |
| 2013/0098641 A1* | 4/2013 | Capsius ................. A62C 35/62 169/19 |

* cited by examiner

FIG. 4C

DRY PIPE/DELUGE VALVE FOR AUTOMATIC SPRINKLER SYSTEMS

RELATED APPLICATION

This application claims the benefit under 35 U.S.C. § 119(e) of the filing date of U.S. Provisional Patent Application No. 62/024,164, filed Jul. 14, 2014, and explicitly incorporates the technical bulletin 358 entitled "Model EX Low Pressure Dry Pipe Valve System" and technical bulletin 359 entitled "Model EX Low Pressure Dry Pipe Valve" included therein.

BACKGROUND

Field of the Invention

Our invention relates to a dry pipe valve for an automatic fire protection sprinkler system, and, in particular, to a hydraulically-operated valve for use as a primary control valve in a dry pipe, deluge, preaction, or other special type of fire protection system.

A conventional fire protection system includes automatic sprinklers that are connected to a conduit to receive a pressurized fire-extinguishing fluid, such as water. Such systems are referred to as "wet pipe" systems, in which the fire-extinguishing fluid fills the conduit such that the fire-extinguishing fluid discharges immediately upon the opening of an automatic sprinkler. A typical automatic sprinkler has a base having a threaded portion for connection to the conduit and having an output orifice to output the fire-extinguishing fluid to provide fire control and/or suppression. The output orifice is sealed by a seal cap that is held in place by a release mechanism. The release mechanism is designed to release the seal cap under predetermined conditions, thereby initiating the flow of fire-extinguishing fluid. A typical release mechanism includes a thermally-responsive element, e.g., a frangible bulb or a fusible link.

In certain applications, fire protection systems are installed with at least a portion of the conduit exposed to freezing temperatures. Such applications may include freezers, unconditioned or partially conditioned areas of buildings, or portions of structures that are open to the outside. The conduit that is located in spaces subject to freezing temperatures is typically filled with a supervisory gas, such as air or nitrogen, that will not freeze at the surrounding temperature. In these fire protection systems, a valve, referred to as a "dry pipe valve," is used to prevent the flow of the fire-extinguishing fluid into the conduit until one or more automatic sprinklers have released (i.e., opened). The valve is typically designed so that the valve remains closed even if the pressure of the supervisory gas on an output end of the valve is lower than the pressure of the fire-extinguishing fluid on an input end of the valve.

A typical dry pipe valve has a main chamber for controlling fluid flow from a supply input to a system output. The valve also has a secondary, i.e., a "sensing" chamber, to which a fluid-based control line is connected. The valve maintains a balance (i.e., a pressure differential) between a pressure of a fluid, i.e., a supervisory gas, in the sensing chamber and a pressure of the fire-extinguishing fluid in a fluid supply input line that is sealed from the main chamber with a cover (referred to as a "clapper"). If the pressure of the supervisory gas in the sensing chamber drops below a certain threshold, the clapper is forced open by the pressure of the fire-extinguishing fluid in the supply line, thereby initiating the flow of the fire-extinguishing fluid through the main chamber to the sprinkler system output.

In dry pipe valve systems, the sprinkler conduits initially act as "pilot" lines, meaning that the pressure of the supervisory gas in the sprinkler conduits serves as a means for detecting a fire condition. In such a system, the pilot lines are connected to the sensing chamber of the dry pipe valve. When a sprinkler is activated in response to a fire condition, the resulting drop in the pressure of the supervisory gas in the pilot lines (and in the sensing chamber) triggers the dry pipe valve to initiate the flow of fire-extinguishing fluid to the sprinklers. The sprinklers on the pilot lines (or on a separate set of conduits) then distribute the fire-extinguishing fluid to extinguish the fire.

A "wet pilot" system may be used in applications where the conduit is not exposed to freezing temperatures. Wet pilot systems contain pressurized fluid, such as water, in the pilot lines. In such a system, the pilot lines are connected to the sensing chamber of the dry pipe valve. When a sprinkler is activated in response to a fire condition, the resulting drop in fluid pressure in the pilot lines (and in the sensing chamber) triggers the dry pipe valve to initiate the flow of the fire-extinguishing fluid to the sprinklers. The sprinklers on the pilot lines (or on a separate set of conduits) then distribute the fire-extinguishing fluid to extinguish the fire.

Electrically-actuated fire protection systems typically employ a solenoid valve that is triggered by electronic fire or smoke detection devices or other types of electrical control devices. The solenoid valve may be connected in series with a wet or dry pilot system. For example, in a "preaction" system, a loss of pressure in the pilot lines initiates an alarm, but the system does not open a central valve until the solenoid valve is electrically-actuated, e.g., by an electrical signal from a smoke detection device. Such systems may be used in sensitive areas, such as computer facilities, in which inadvertent activation of the sprinklers would cause significant damage.

SUMMARY

In one embodiment of our invention, a dry pipe valve includes a main chamber having an input port for receiving fluid from a supply line, and having an output port. The dry pipe valve further includes a clapper assembly installed in the main chamber for sealing the input port. The clapper assembly includes a clapper configured to seal the input port, and the clapper is hinged to the main chamber. The clapper assembly further includes a hinged lever movable between a first position, in which the clapper is held closed by the lever, and a second position, in which the clapper is allowed to open. The dry pipe valve also includes a pushrod mounted in the dry pipe valve so as to be perpendicular to a direction of a main flow through the valve, and connected to the hinged lever. The pushrod extends through a pushrod chamber having an inlet that is fluidly connected to an input supply to the dry pipe valve, and an outlet. The pushrod is in communication with the lever to urge the lever against the clapper in the first position. In some embodiments, the lever has a third position in which the lever prevents the clapper from closing. According to one embodiment, a dry valve actuator is directly attached to a housing of the pushrod chamber and is connected to the outlet of the pushrod chamber. The dry valve actuator is mounted generally perpendicular to the main flow of the dry pipe valve. In some embodiments, a handle on the exterior of the dry pipe valve permits the lever to be moved from the third position to the first position and to second position without requiring disassembly of the dry pipe valve.

In some embodiments, the dry valve actuator includes a diaphragm and a seal that abut against a seat positioned in the outlet of the pushrod chamber, and the dry valve actuator is pressurized on the opposite side of the diaphragm from the pushrod chamber by a supervisory gas that is supplied from the output port of the dry pipe valve.

According to one embodiment, a pressure of the supply fluid acts on an underside of the clapper and on the pushrod through the inlet of the pushrod chamber. When a pressure of the supervisory gas is reduced, the dry valve actuator permits fluid from the pushrod chamber to drain, thereby reducing the pressure of the supply fluid in the pushrod chamber. When the pressure of the supply fluid in the pushrod chamber decreases sufficiently, the pushrod allows the lever to move to the second position, and an upward force of the pressure of the supply fluid beneath the clapper overcomes a force applied by the lever, thereby opening the clapper.

In yet another embodiment, the dry valve actuator is provided with an inlet for receiving fluid and an outlet for releasing fluid.

According to one embodiment, the pressure of the supervisory gas in the dry valve actuator is up to and including 40 psi. According to another embodiment, the pressure of the supervisory gas in the dry valve actuator is between 8 and 25 psi.

Further features and advantages, as well as the structure and operation of various embodiments herein, are described in detail below with reference to the accompanying drawings.

BRIEF DESCRIPTION OF THE DRAWINGS

The teachings claimed and/or described herein are further described in terms of embodiments. These embodiments are described in detail with reference to the drawings. These embodiments are non-limiting embodiments, in which like reference numerals represent similar structures throughout the several views of the drawings.

FIGS. 4A-4C are cross-sectional views of the dry pipe valve shown in FIGS. 3A, and 3B, and in particular.

Any reference numeral that appears in different figures represents the same element in those figures, even if that element is not described separately with respect to each figure.

DETAILED DESCRIPTION

Figure 1A:
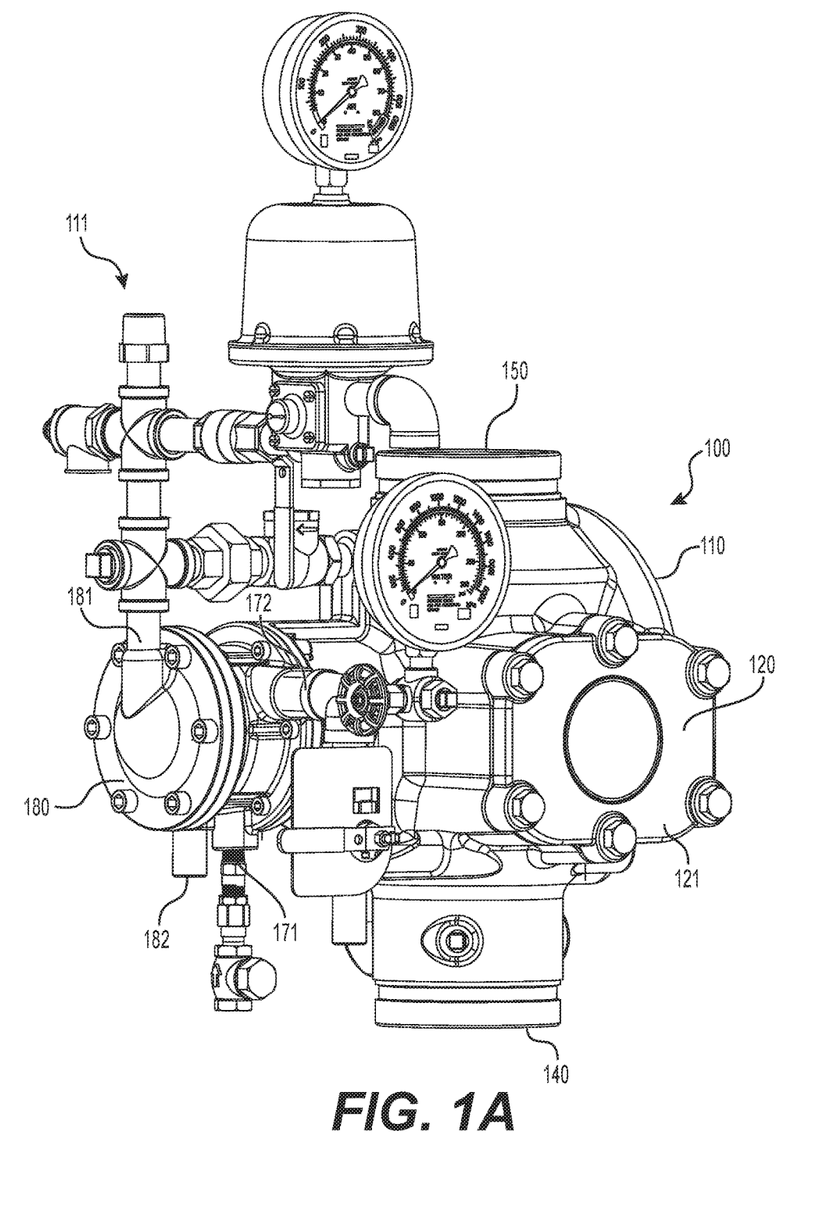
FIGS. 1A and 1B are perspective and front views, respectively, of a dry pipe valve system for an automatic sprinkler system, in accordance with an embodiment described herein.
Figure 1B:
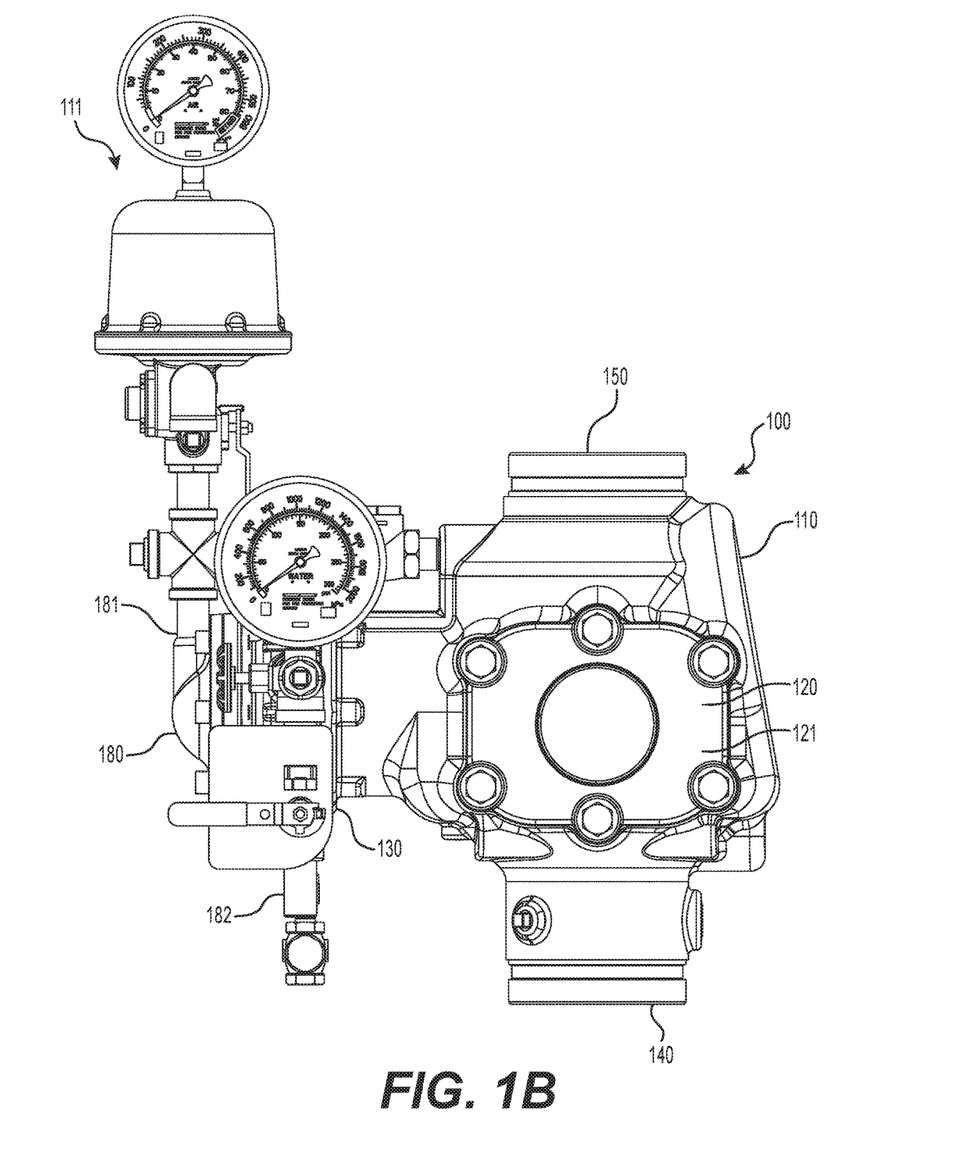
Figure 2:
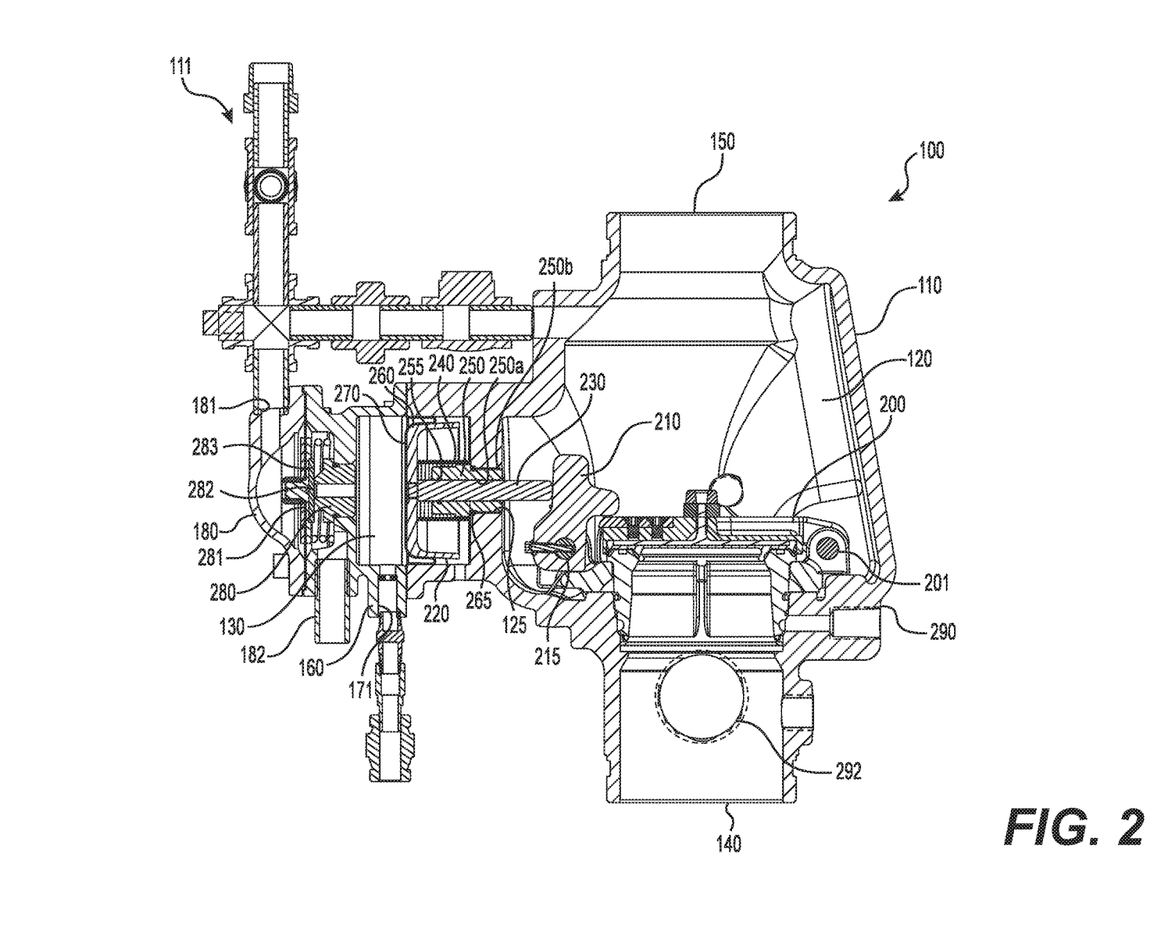
FIG. 2 is a cross-sectional view of the dry pipe valve system shown in FIGS. 1A and 1B.

FIGS. 1A, 1B, 3A, and 3B show a dry pipe valve 100, in accordance with an embodiment of our invention. As shown in FIG. 2, the dry pipe valve 100 has a main body 110 with a main chamber 120 and a pushrod chamber 130. The dry pipe valve 100 may be formed, for example, of ductile iron, using a casting process. An input port 140 for connecting to a high pressure fluid supply line (not shown) is provided at the bottom of the main chamber 120. The supply line connected to the input port 140 may have a nominal inner diameter of, e.g., about 2 inches (50.8 mm), and may provide fluid at a pressure of, e.g., up to about 250 psi or 300 psi (1723.7 kPa or 2068.43 kPa). Other sizes also are possible, such as, for example, 2.5 inches (63.5 mm), 3 inches (76.2 mm), 4 inches (101.6 mm), 6 inches (152.4 mm), and 8 inches (203.2 mm). An output port 150 is connected to a system of sprinkler conduits (not shown), and is provided at the top of the main chamber 120. The output port 150 has the same nominal diameter as the input port 140. The main chamber 120 has an access panel 121, shown in FIGS. 1A and 1B, for installation and maintenance of internal parts of the main chamber 120 that are described in detail below in connection with FIG. 2.

As shown in FIG. 2, a disk-shaped lid, referred to as a clapper 200, seals the input port 140 from the main chamber 120 at a bottom of the main chamber 120. The clapper 200 is connected to the main body 110 by way of a clapper hinge 201. A hinged lever 210, mounted on a hinge 215, is also connected to the main body 110 on a side of the main chamber 120 opposite to the clapper hinge 201. The hinged lever 210 is movable between a first position, in which the hinged lever 210 holds the clapper 200 closed in a first clapper position (shown as 200a in FIG. 4A), and a second position, in which the hinged lever 210 allows the clapper 200 to open to a second clapper position (shown as 200c in FIG. 4C). In addition, the hinged lever 210 is movable to a third position, in which the hinged lever 210 prevents the clapper 200 from closing by holding the clapper 200 in a third clapper position (shown as 200b in FIG. 4B). A more detailed description of a clapper assembly can be found, for example, in U.S. Pat. No. 7,673,695, the entire contents of which are incorporated herein by reference.

Figure 3A:
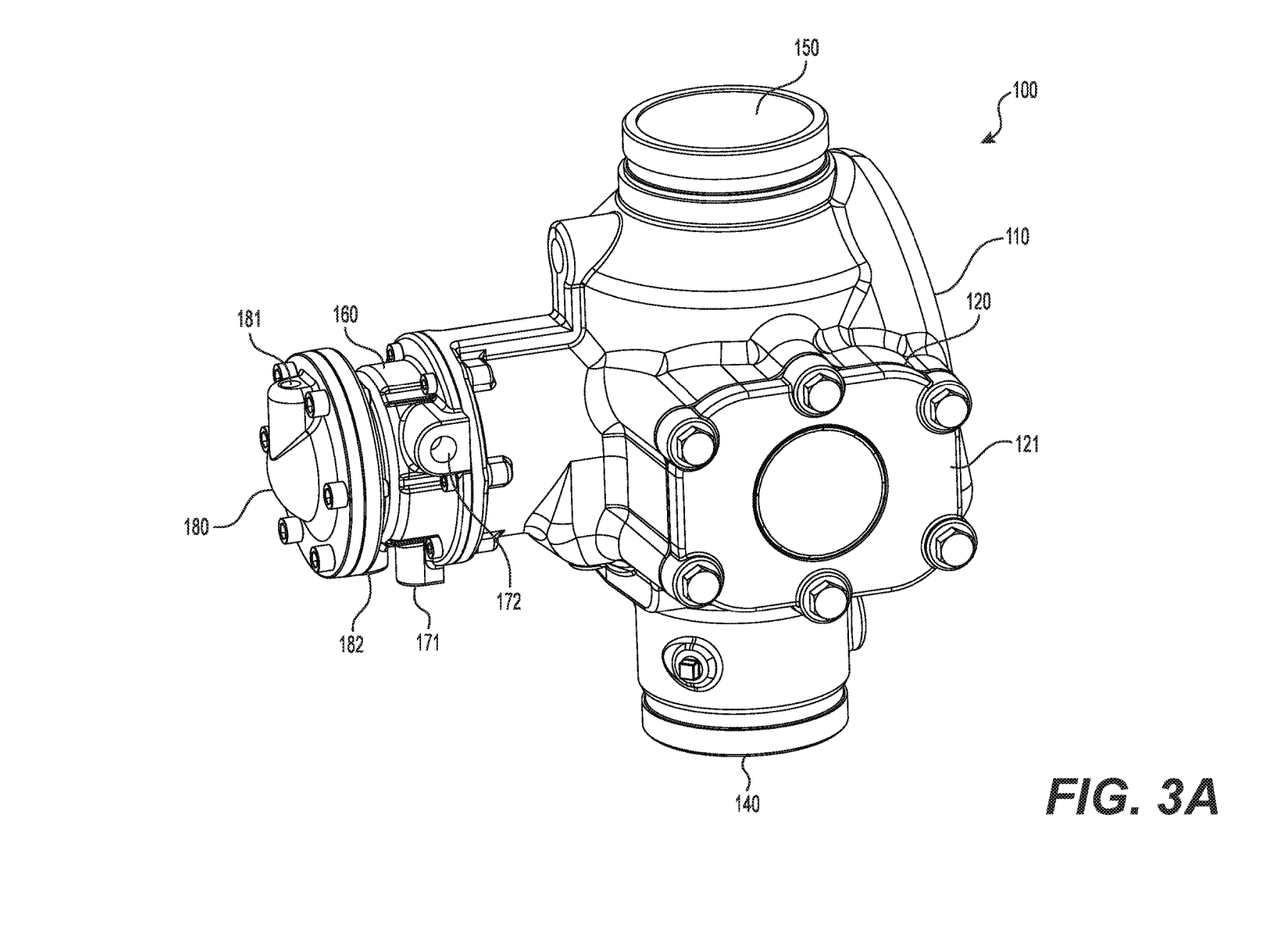
FIGS. 3A and 3B are front and rear perspective views, respectively, of a dry pipe valve for an automatic sprinkler system, in accordance with an embodiment described herein.

The pushrod chamber 130 is cylindrically-shaped and is attached to the side of the main chamber 120 opposite to the clapper hinge 201. As shown in FIG. 3A, the pushrod chamber 130 has a cylindrical housing 160 that has a control fluid input port 171 on a bottom of the housing 160 and a control fluid output port 172 on a side of the housing 160. The control fluid output port 172 may be positioned to be perpendicular to the control fluid input port 171. As shown in FIG. 1A, the control fluid output port 172 may be connected to a valve and a pressure.

As noted above, the edge of the clapper 200 opposite to the clapper hinge 201 is held in place by the hinged lever 210 that, in turn, is held in place by a piston 260 and a pushrod assembly 220, including a pushrod 230 that extends into the main chamber 120 from the pushrod chamber 130. The pushrod 230 extends from the pushrod chamber 130 into the main chamber 120 through a bore 250a of a threaded, cylindrical pushrod guide 250 that is screwed into a threaded opening 125 in the main chamber 120. The pushrod 230 urges the hinged lever 210 against the clapper 200 when the clapper 200 is in the first clapper position. The pushrod 230 is in communication with the hinged lever 210 to allow movement of the hinged lever 210 between the first position and the second position. In one embodiment, the pushrod 230 may be about 3 inches (76.2 mm) in length and about 0.5 inches (12.7 mm) in diameter (for the embodiment having an input port diameter of between 2 and 3 inches (50.8 and 76.2 mm). The pushrod assembly 220 also includes a spring 240 that surrounds the pushrod guide 250 and is configured to exert a force on the piston 260 in a direction away from the main chamber 120. The pushrod guide 250 has the bore 250a with a circumferential groove 250b configured to receive an O-ring 255 to help seal the space between the pushrod 230 and the pushrod guide 250. In some embodiments, a base of a threaded portion 250b of the pushrod guide 250 includes an O-ring groove that is configured to receive an O-ring 265. The piston 260, the pushrod 230, and the spring 240 may all be formed, for example, of stainless steel. In some example embodiments, the pushrod guide 250 may be formed, for example, of plastic, and in particular, of a commercially available acetal resin, such as Delrin® (a trademark of DuPont Corporation).

Figure 4A:
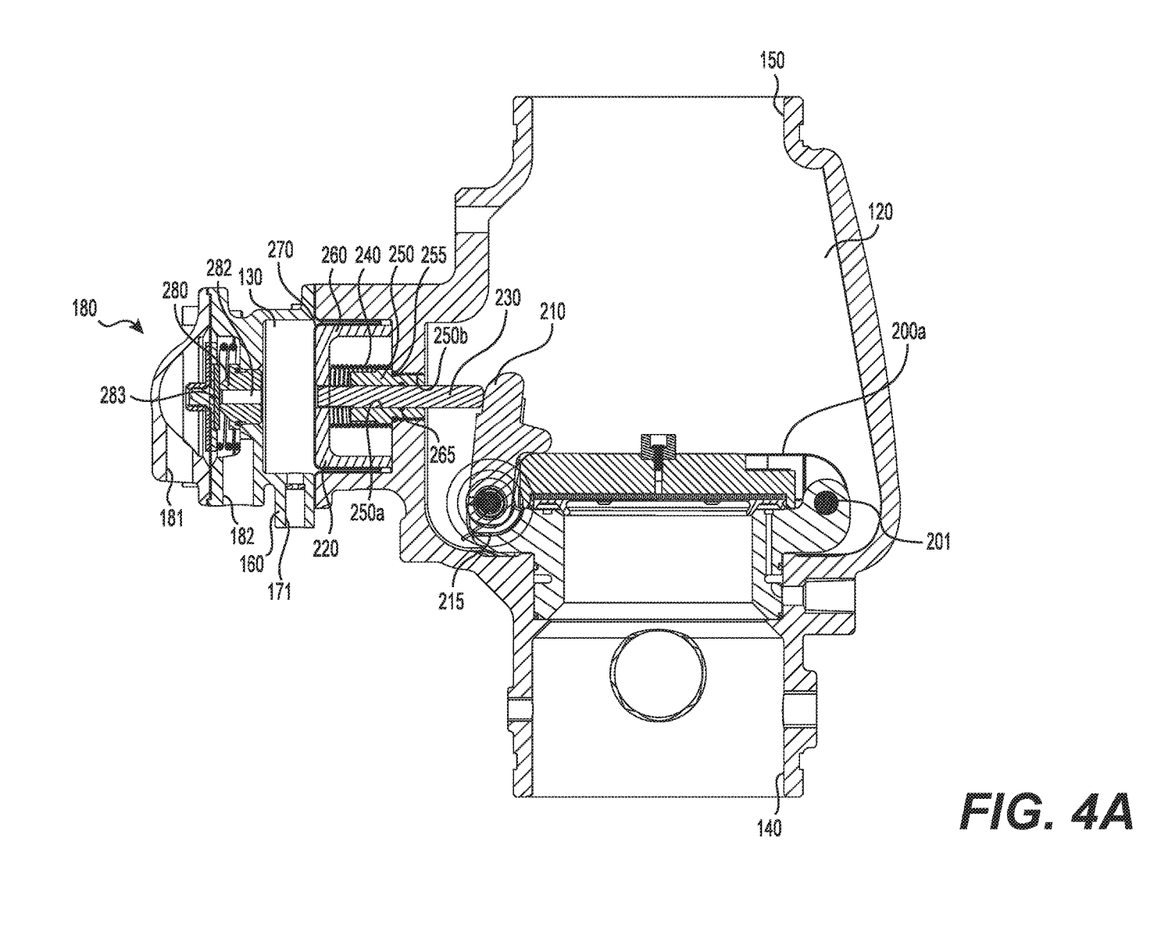
FIG. 4A shows the clapper in a position in which the clapper is held closed by a lever.

The pushrod chamber 130 contains a pressurized fluid, supplied through the control fluid input port 171, in a volume between a head of the piston 260 and the walls of the pushrod chamber 130. A pressure of the pressurized fluid in the pushrod chamber 130 acts to maintain the piston 260 in an unreleased position against a right side of the pushrod chamber 130, as shown in FIG. 4A (i.e., the pressure of the pressurized fluid urges the pushrod 230 against the hinged lever 210 to maintain the clapper 200 in the first clapper position). The force of the pressurized fluid against the piston 260 is countered by force of the spring 240 and the force exerted by the hinged lever 210 against the pushrod 230, due to the upward force on the clapper 200 by the supply fluid.

According to one embodiment, a dry valve actuator 180 is directly attached to the housing of the pushrod chamber 130 so as to be built-in to the dry pipe valve 100. The dry valve actuator 180 is mounted generally perpendicular to the main flow of the dry pipe valve 100. The dry valve actuator 180 includes a diaphragm 281 and a seal 283 that abut against a seat 280 positioned in an outlet of the pushrod chamber 130, and the dry valve actuator 180 is pressurized on an opposite side of the diaphragm 281 from the pushrod chamber 130 by a supervisory gas supplied from the output port 150 of the dry pipe valve 100 (e.g., gas provided by a supervisory system 111). As shown in FIG. 2, the supervisory system 111 may be connected to both the main chamber 120 of the valve body 110, and to an inlet 181 of the dry valve actuator 180, described below.

The seat 280 is cylindrical, and extends between and through the dry valve actuator 180 and the pushrod chamber 130. The seat 280 has a port 282 extending roughly along an axis of the seat 280 from a first end of the seat 280 to a second end of the seat 280. As shown in FIG. 2, the port 282 is open to the pushrod chamber 130 at one end and may be sealed by the seal 283 and the diaphragm 281 at another end. A diaphragm 270 is included in the pushrod chamber 130 and separates the fluid in a portion of the pushrod chamber 130 from another portion of the pushrod chamber 130 that includes the pushrod assembly 220, as shown in FIG. 2. The dry valve actuator 180 further includes the inlet 181 that is connected to the supervisory system 111, and an outlet 182. FIG. 2 also shows the diaphragm 281 separating a portion of the dry valve actuator 180 having the inlet 181 and another portion of the dry valve actuator 180 having the outlet 182.

When a sprinkler (not shown) operates, a loss of air or nitrogen pressure in piping of a sprinkler system (i.e., in the supervisory system 111) causes the diaphragm 281 and the seal 283 in the dry valve actuator 180 to move away from the seat 280. The separation of the seal 283 from the seat 280 allows for discharge of the fluid from the pushrod chamber 130. Since the pressure of the fluid cannot be replenished through the control fluid input port 171 as rapidly as the fluid is discharged, the pressure of the fluid in the pushrod chamber 130 falls instantaneously. When the pressure of the fluid in the pushrod chamber 130 approaches, for example, approximately one-third of the pressure of the supply fluid, the upward force of the pressure of the supply fluid acting beneath the clapper 200 overcomes the force applied by the hinged lever 210, thereby opening the clapper to the second clapper position, shown as 200c in FIG. 4C.

A gas (e.g., air, nitrogen, or a mixture thereof) is supplied to the dry valve actuator 180 through the supervisory system 111 by an automatic tank-mounted air compressor, or another continuous air supply sized for the capacity (volume) of the dry pipe system piping, that is capable of restoring normal air pressure in the supervisory system 111 within 30 minutes. When the supervisory gas pressure is reduced, the dry valve actuator 180 permits fluid from the pushrod chamber 130 to drain, thereby reducing the pressure of the fluid in the pushrod chamber 130. When the pressure in the pushrod chamber 130 decreases sufficiently, the hinged lever 210 is permitted to move to the second position, allowing the clapper 200 to open. In one embodiment, the clapper 200 is maintained in the closed position (i.e., the first clapper position) when a ratio of (1) the pressure of the supply fluid in the input port 140 to (2) the pressure of the supervisory gas in the output port 150 is between 8 and 25. In other embodiments, a ratio of (1) an area of the clapper 200 exposed to the supervisory gas in the output port 150 to (2) the area of the clapper exposed to the supply fluid in the input port 140 is between 0.5 and 2.0.

In some embodiments, the pressure of the supervisory gas in the supervisory system 111 is preferably between 8 and 28 psi (55.16 and 193.053 kPa). The pressure of the supervisory gas in the supervisory system 111, however, can be up to and include 40 psi (275.79 kPa). The continuous air supply, e.g., a compressed air or nitrogen source, is equipped with an automatic pressure maintenance device (not shown) capable of maintaining a constant system pressure regardless of pressure fluctuations in the continuous air supply. In some embodiments, the supervisory gas is air. In other example embodiments, the supervisory gas is a mixture of nitrogen and air containing not less than 95% nitrogen. Of course, the present disclosure is not limited to such a mixture of nitrogen and air, and other mixtures can be used. The pressure maintenance device includes galvanized trim and brass parts, including a strainer and a field adjustable air pressure regulator, and has a working pressure rating of around 175 psi (1206.6 kPa). The pressure regulator has an adjustable outlet pressure range of 5 to 50 psi (34.5 kPa to 344.7 kPa).

Figure 4B:
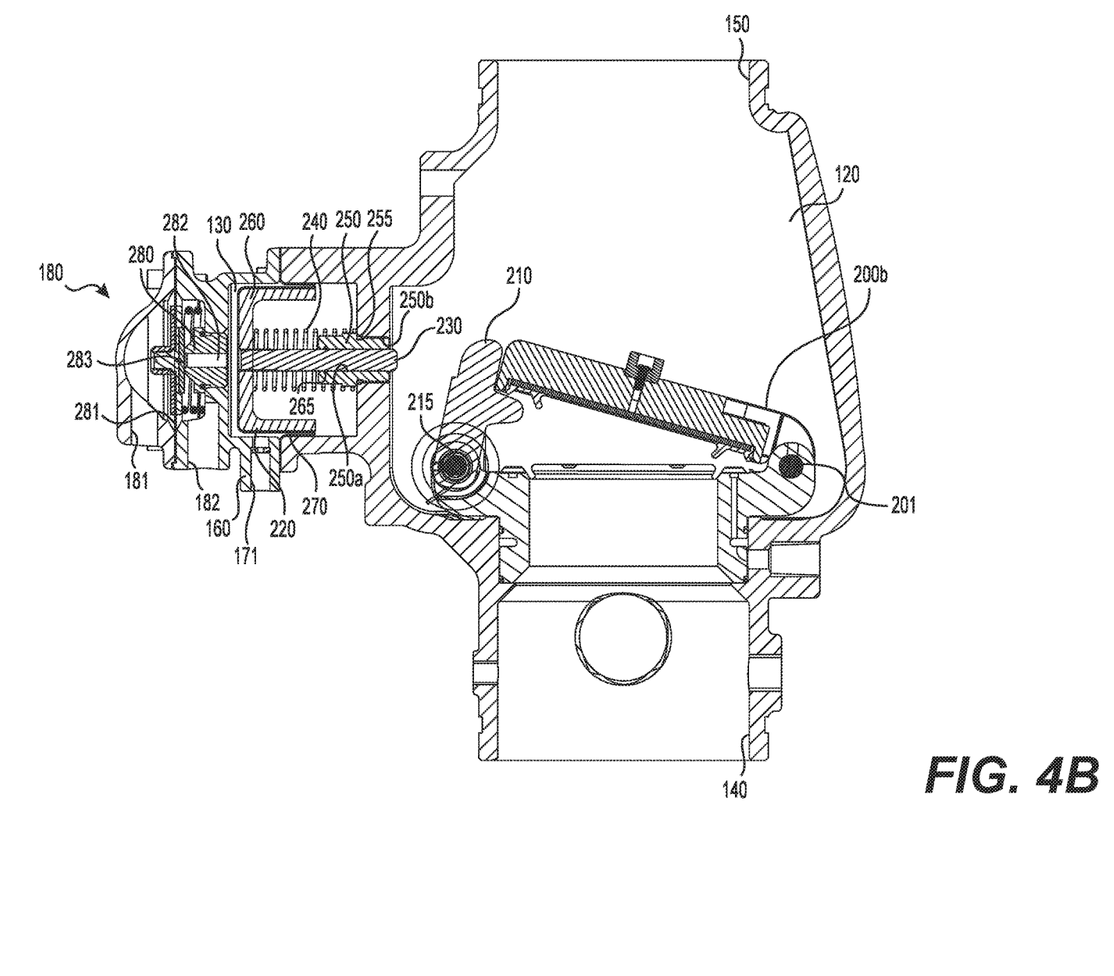
FIG. 4B shows the clapper in a position in which the clapper is prevented from closing by the lever.
Figure 4C:
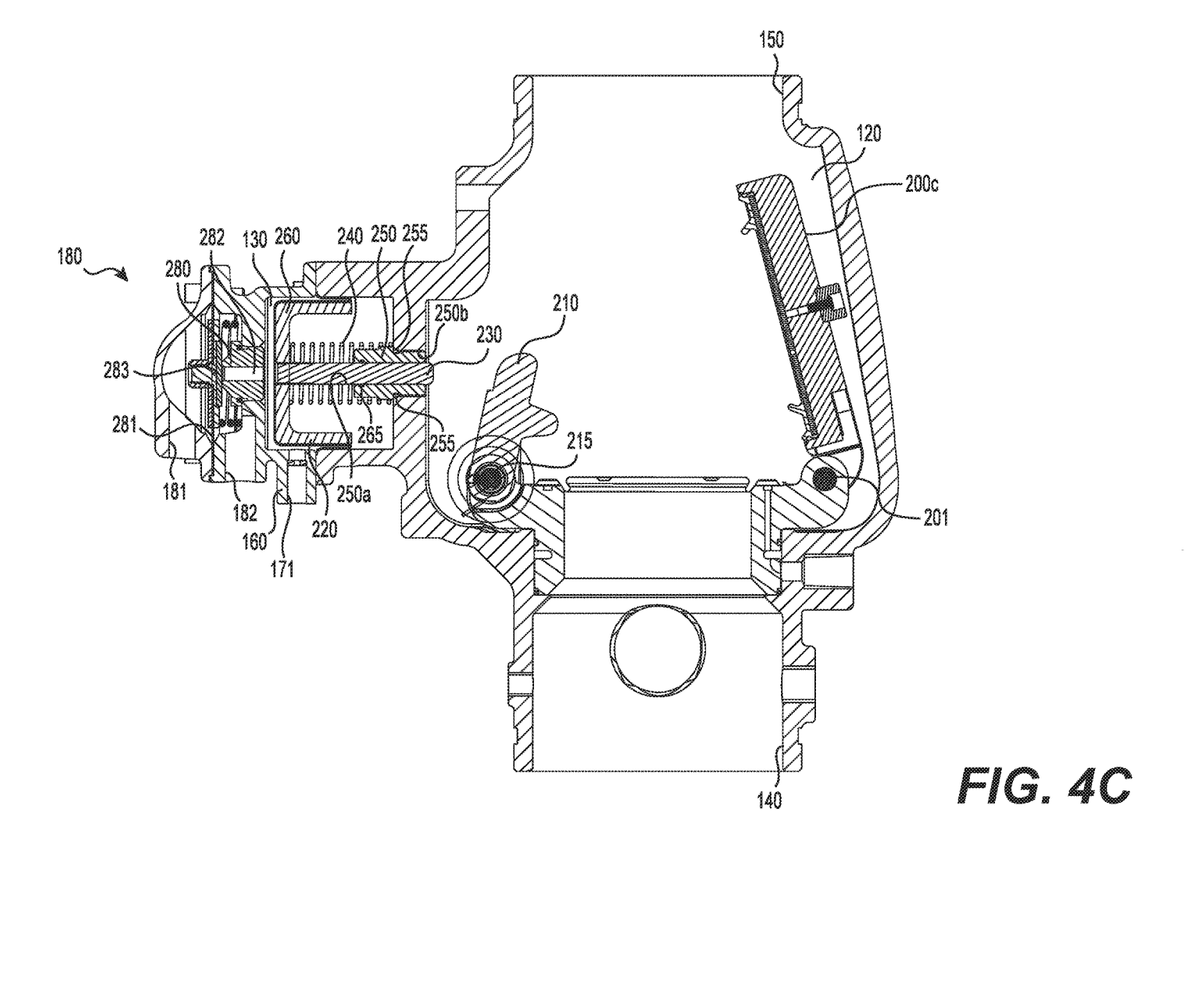
FIG. 4C shows the clapper in a position in which the clapper is opened.

Once the clapper 200 has opened to the second position, shown in FIG. 4B, the hinged lever 210 acts as a latch, preventing the clapper 200 from returning to the closed position (shown as 200b in FIG. 4B). The fluid, e.g., water, from the fluid supply flows through the dry pipe valve 100 into the system piping. Water also flows through an alarm outlet 290 of the dry pipe valve 100 to alarm devices (not shown). A more detailed description of the operation of the dry pipe valve 100, upon release of the clapper 200, can be found in U.S. Pat. No. 7,673,695.

Figure 3B:
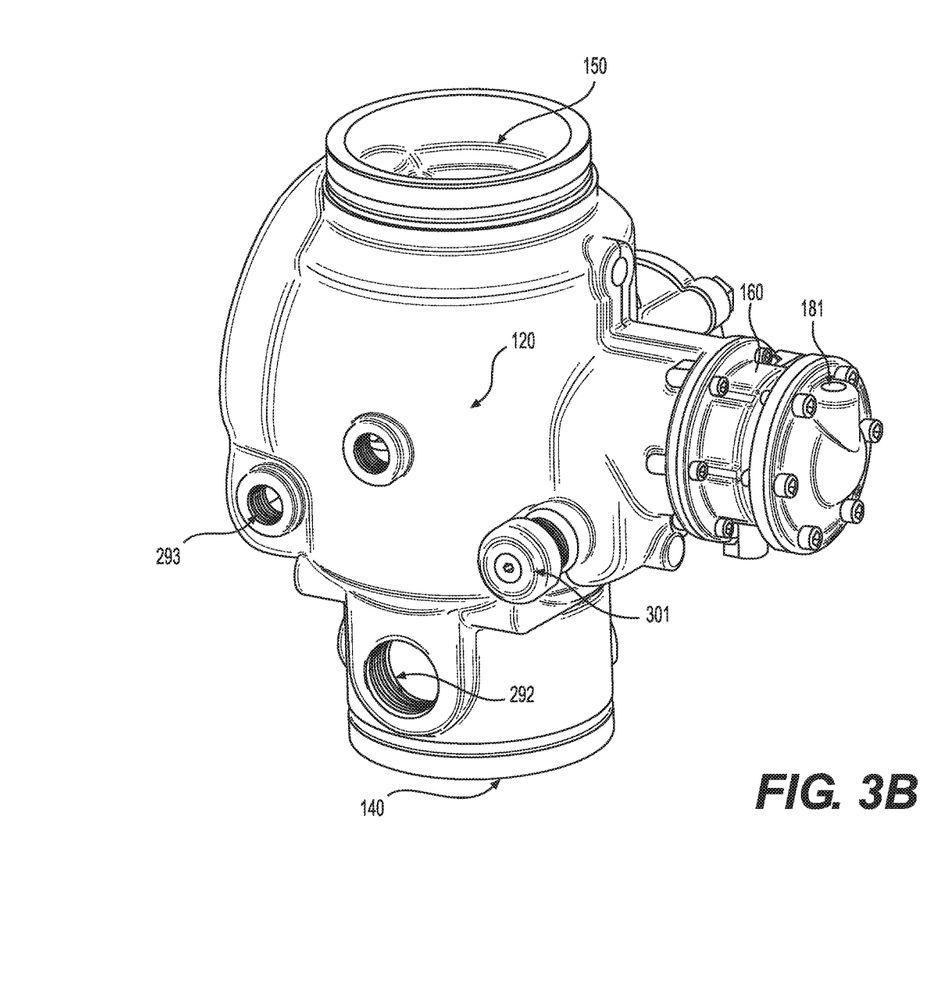

After a system shutdown, the dry pipe valve 100 can be reset by pushing in and turning a reset knob 301, as shown in FIG. 3B. The external reset feature of the dry pipe valve 100 allows the clapper 200 to quickly be reset to the closed position (i.e., the first position shown in FIG. 4A), without the need to disassemble the dry pipe valve 100. In this regard, the reset knob 301 allows the hinged lever 210 to be manually moved from the third position to the second position, and to the first position sealing the clapper 200 against the input port 140.

In the event that water builds up inside the dry pipe valve 100 due to condensation from the supervisory gas system 111, or if water is left inside following valve system testing, a condensation drain port 293 is provided for venting (i.e., draining) of that water. A drain port 292 can also be provided for venting if water is left inside the valve system.

By virtue of the foregoing disclosure, a dry pipe valve can be provided that requires considerably less air or nitrogen pressure than the available water supply pressure. As a result, fire protection systems installed in refrigerated areas, for example, the lower air pressure can decrease the possibility of ice plugs that could impede or prevent the flow of water to sprinkler heads in the event of a fire. Moreover, lower air pressure (volume) will enable use of smaller capacity, lower cost dehydration equipment when such equipment is required. Lower air or nitrogen pressure can also reduce a water delivery time when the system actuates, and in some cases, may eliminate the need for an accelerator. Low pressure requirements can make the use of dry nitrogen gas, instead of air, practical even on larger systems, and as a result, the systems have a lower-than-air dew point that minimizes ice plugging of system lines, and the systems have enhanced user friendliness during installation and operation. In addition, since priming water is not required and the dry pipe valve can be reset externally without cover removal, system maintenance is simplified, providing a significant system-restoration time advantage.

While the present disclosure has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

In addition, it should be understood that the attached drawings help to explain functionality described herein, and are presented as illustrative examples. The architecture of the present disclosure is sufficiently flexible and configurable, such that it can be utilized and navigated in ways other than those shown in the drawings.

What is claimed is:

1. A dry pipe valve configured to switch between an open state and a closed state, the dry pipe valve comprising:
   (A) a valve body including:
      (a) a main body including a main chamber;
      (b) an input port configured to connect to a supply line to receive a fluid from the supply line;
      (c) an output port configured to connect to a system of sprinkler conduits, the input port and the output port being centered on and aligned on a fluid flow axis;
      (d) a valve body supervisory gas inlet configured to receive a supervisory gas from a supervisory gas supply;
      (e) a cylindrical mounting portion that is centered on a pushrod axis that is perpendicular to the fluid flow axis, and that is provided between the input port and the output port; and
      (f) a cylindrical pushrod chamber opening centered on the pushrod axis and provided within the cylindrical mounting portion;
   (B) a clapper assembly provided in the main chamber of the main body, the clapper assembly including:
      (a) a first hinge, connected to the main body on a first side of the main chamber;
      (b) a clapper, mounted on the first hinge, and configured to rotate on the first hinge between (i) a first clapper position, in which the clapper seals the input port to prevent flow of the fluid through the main body when the dry pipe valve is in the closed state, (ii) a second clapper position, in which the clapper is open to permit flow of the fluid through the main body when the dry pipe valve is in the open state, and (iii) a third clapper position, in which the clapper is open and is prevented from sealing the input port;
      (c) a second hinge, connected to the main body on a second side of the main chamber, the second side being opposite to the first side of the main chamber with respect to the input port; and
      (d) a lever, mounted on the second hinge, and configured to rotate between (i) a first lever position, in which the lever holds the clapper in the first clapper position, and (ii) a second lever position, in which the lever does not hold the clapper in the first clapper position;
   (C) a pushrod assembly including:
      (a) a pushrod housing centered on the pushrod axis, the pushrod housing including:
         (i) a first side cylindrical portion having (1) a first flange at one end along the pushrod axis, the first flange being configured to be mounted on the cylindrical mounting portion of the valve body, (2) a pushrod chamber inlet, provided on one side of the pushrod housing relative to the pushrod axis, and extending through the first flange along an axis that is perpendicular to the pushrod axis, the pushrod chamber inlet being configured to receive the fluid from the supply line, and (3) a first inner diameter;
         (ii) a second side cylindrical portion having (1) a second flange at one end along the pushrod axis, opposite to the end having the first flange, (2) a pushrod chamber outlet, provided on the one side of the pushrod housing relative to the pushrod axis, and extending through the second flange along an axis that is perpendicular to the pushrod axis, and (3) a second inner diameter that is less than the first inner diameter; and
         (iii) a central cylindrical portion provided between the first side cylindrical portion and the second side cylindrical portion, the central cylindrical portion having a third inner diameter that is less than the second inner diameter, the central cylindrical portion of the pushrod housing, the first side cylindrical portion of the pushrod housing, and the cylindrical mounting portion of the valve body defining a pushrod chamber,
      the first side cylindrical portion, the second side cylindrical portion, and the central cylindrical portion of the pushrod housing being formed as a singular housing;
      (b) a seat positioned in the central cylindrical portion of the pushrod housing, and having a central port that extends along the pushrod axis, the central port having a first opening to the first side cylindrical portion and a second opening to the second side cylindrical portion;
      (c) a pushrod guide having (i) a threaded portion that is threadably inserted into the cylindrical pushrod chamber opening of the valve body, (ii) an extension portion that extends from the threaded portion away from the main chamber and into the pushrod chamber, and (iii) a central bore along the pushrod axis through the threaded portion and the extension portion;

(d) a pushrod mounted in the central bore of the pushrod guide and extending along the pushrod axis, and configured to move along the pushrod axis between (i) a first pushrod position, in which a first end of the pushrod contacts and urges the lever of the clapper assembly to hold the lever in the first lever position, and (ii) a second pushrod position, in which the first end of the pushrod does not contact the lever of the clapper assembly;

(e) a piston attached to a second end of the pushrod in the pushrod chamber, the piston being configured to move with the pushrod, and to retain the second end of the pushrod in the pushrod chamber; and (f) a pushrod diaphragm provided between the cylindrical mounting portion of the valve body and the first side cylindrical portion of the pushrod housing, the pushrod diaphragm separating a first portion of the pushrod chamber configured to contain the fluid supplied through the pushrod chamber inlet, from a second portion of the pushrod chamber that includes the pushrod guide, the pushrod, and the piston, the pushrod assembly being configured to switch between (i) a pressurized state in which the first portion of the pushrod chamber is filled with the fluid, and the pushrod diaphragm causes the piston and the pushrod to move toward the valve body, so that the pushrod is in the first pushrod position, and (ii) a released state, in which the first portion of the pushrod chamber is not filled with the fluid, and the pushrod diaphragm, the piston, and the pushrod move away from the valve body, so that the pushrod is in the second pushrod position; and (D) a dry valve actuator including:

(a) a dry valve actuator housing having a cup shape that defines a dry valve actuator chamber, and including (i) an open end that is directly attached to the second flange of the pushrod housing, and (ii) a dry valve actuator supervisory gas inlet provided near a second end that is opposite to the open end with respect to the pushrod axis, and extending in a direction that is perpendicular to the pushrod axis, from a side of the dry valve actuator housing that is opposite to the one side of the pushrod chamber housing relative to the pushrod axis, the dry valve actuator supervisory gas inlet being configured to receive the supervisory gas from the supervisory gas supply;

(b) a seal configured to seal the second opening of the central port of the seat when the seal is positioned in the seat; and (c) a dry valve actuator diaphragm provided between the open end of the dry valve actuator housing and the second side cylindrical portion of the pushrod housing, the dry valve actuator diaphragm being attached to the seal, and defining a first portion of the dry valve actuator chamber that includes the dry valve actuator supervisory gas inlet, and a second portion of the dry valve actuator chamber that includes the second opening of the central port, the dry valve actuator being configured to switch between (i) a pressurized state, in which the first portion of the dry valve actuator chamber is filled with the supervisory gas, causing the dry valve actuator diaphragm to position the seal in the seat, and thereby seal the second opening of the central port of the seat, and (ii) a released state, in which the first portion of the dry valve actuator chamber is not filled with the supervisory gas, and the dry valve actuator diaphragm and the seal move away from the seat to open the second opening of the central port of the seat, wherein, when the dry valve actuator is in the pressurized state, the pushrod assembly is in the pressurized state, and, when the dry valve actuator is in the released state, the pushrod assembly is in the released state.

2. The dry pipe valve of claim 1, wherein a pressure of the fluid from the supply line acts on an underside of the clapper when the clapper is in the first clapper position, and the pressure of the fluid in the first portion of the pushrod chamber acts on the pushrod diaphragm, to urge the pushrod into the first pushrod position.

3. The dry pipe valve of claim 2, wherein, when a pressure of the supervisory gas in the system of sprinkler conduits is less than a predetermined gas pressure, the dry valve actuator switches from the pressurized state to the released state, permitting the fluid in the first portion of the pushrod chamber to drain through the pushrod chamber outlet and reducing the pressure of the fluid in the pushrod chamber, and, when the pressure of the fluid in the pushrod chamber decreases to a predetermined fluid pressure, the pushrod moves to the second pushrod position, allowing the lever to move to the second lever position, and allowing the clapper to move into one of the second clapper position and the third clapper position.

4. The dry pipe valve of claim 2, wherein the supervisory gas is supplied to an upper side of the clapper in the main chamber, and the clapper is maintained in the first clapper position when a ratio of (i) the pressure of the fluid from the supply line on the underside of the clapper to (ii) a pressure of the supervisory gas on the upper side of the clapper is between 8 and 25.

5. The dry pipe valve of claim 1, wherein the lever is further configured to rotate to a third lever position, in which the lever prevents the clapper from moving to the first clapper position.

6. The dry pipe valve of claim 5, further comprising a handle, provided on an exterior surface of the valve body and connected to the lever, wherein manual rotation of the handle causes movement of the lever from the third lever position to one of the second lever position and the first lever position.

7. The dry pipe valve of claim 1,
wherein the supervisory gas is supplied to an upper side of the clapper in the main chamber, and a pressure of the fluid from the supply line acts on an underside of the clapper, and
wherein, when the clapper is in the first clapper positions, a ratio of (i) an area of the upper side of the clapper exposed to the supervisory gas to (ii) an area of the underside of the clapper exposed to the fluid is between 0.5 and 2.0.

8. The dry pipe valve of claim 1, wherein a pressure of the supervisory gas in the first portion of the dry valve actuator chamber is up to and including 40 psi.

9. The dry pipe valve of claim 1, wherein a pressure of the supervisory gas in the first portion of the dry valve actuator chamber is between 8 and 25 psi.

10. The dry pipe valve of claim 1, wherein the supervisory gas is air.

11. The dry pipe valve of claim 1, wherein the supervisory gas is not less than 95% nitrogen.

12. The dry pipe valve according to claim 1, wherein an inner diameter of the open end of the dry valve actuator housing is equal to the second inner diameter of the second side cylindrical portion of the pushrod housing.

13. The dry pipe valve according to claim 1, wherein the clapper assembly further includes (e) a lever spring attached to the lever and surrounding the second hinge, the lever spring being configured to bias the lever toward the first lever position.

14. The dry pipe valve according to claim 13, wherein the pushrod assembly further includes (g) a pushrod spring attached (i) to a side of the piston that faces the valve body, and (ii) to a side of the cylindrical mounting portion of the valve body, the pushrod spring surrounding the pushrod, and being configured to bias the pushrod diaphragm, the piston, and the pushrod towards the central cylindrical portion of the pushrod housing and away from the valve body.

15. The dry pipe valve according to claim 14, wherein, when the pushrod assembly is in the pressurized state, the pushrod spring is in a compressed state, and, when the pushrod assembly is in the released state, the pushrod spring is in a non-compressed state.

\* \* \* \* \*